United States Patent
Pope

(10) Patent No.: US 9,122,981 B1
(45) Date of Patent: Sep. 1, 2015

(54) DETECTING UNEXPECTED BEHAVIOR

(75) Inventor: Elmore Eugene Pope, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 13/160,989

(22) Filed: Jun. 15, 2011

(51) Int. Cl.
*G06F 17/00* (2006.01)
*G06N 5/02* (2006.01)
*G06N 5/00* (2006.01)

(52) U.S. Cl.
CPC . *G06N 5/003* (2013.01); *G06N 5/02* (2013.01)

(58) Field of Classification Search
CPC ..................................................... G06N 5/003
USPC ........................................ 707/727; 705/14.47
See application file for complete search history.

(56) References Cited

U.S. PATENT DOCUMENTS

| | | | | |
|---|---|---|---|---|
| 7,610,040 | B2 * | 10/2009 | Cantini et al. | 455/410 |
| 2006/0208071 | A1 * | 9/2006 | Chang et al. | 235/383 |
| 2007/0129990 | A1 * | 6/2007 | Tzruya et al. | 705/10 |
| 2009/0083184 | A1 * | 3/2009 | Eisen | 705/50 |
| 2010/0114617 | A1 * | 5/2010 | Bobbitt et al. | 705/7 |
| 2010/0125406 | A1 * | 5/2010 | Prehofer | 701/201 |
| 2010/0306179 | A1 * | 12/2010 | Lim | 707/688 |
| 2010/0332491 | A1 * | 12/2010 | Cui et al. | 707/759 |
| 2011/0066650 | A1 * | 3/2011 | Fuxman et al. | 707/776 |
| 2011/0078140 | A1 * | 3/2011 | Dube et al. | 707/727 |
| 2011/0087531 | A1 * | 4/2011 | Winters et al. | 705/14.17 |

OTHER PUBLICATIONS

U.S. Appl. No. 13/076,237, filed Mar. 30, 2011 for "Inferring User Intent Based on Network Navigation Paths".

* cited by examiner

*Primary Examiner* — Kakali Chaki
*Assistant Examiner* — Peter Coughlan
(74) *Attorney, Agent, or Firm* — Thomas | Horstemeyer, LLP

(57) ABSTRACT

Disclosed are various embodiments for detecting unexpected behavior. A path associated with a user is tracked. It is determined whether the path corresponds to at least one intent grouping that in turn corresponds to an expected behavior. Unexpected behavior is identified when the path does not correspond to at least one intent grouping.

23 Claims, 3 Drawing Sheets

DETECTING UNEXPECTED BEHAVIOR

BACKGROUND

Products received in a fulfillment center are often associated with various product attributes. In the context of an electronic commerce system, certain product attributes may be desirable by customers but not marketed and/or categorized according to these attributes by electronic commerce systems. Attributes that may cause a product to be desired by consumers may come from various sources, such as, but not limited to, the product's exterior packaging, the manufacturer, and/or third party sources. Additionally, it may be difficult to determine what categories and/or attributes associated with a product that customers desire and generate subsequent product recommendations and targeting campaigns.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
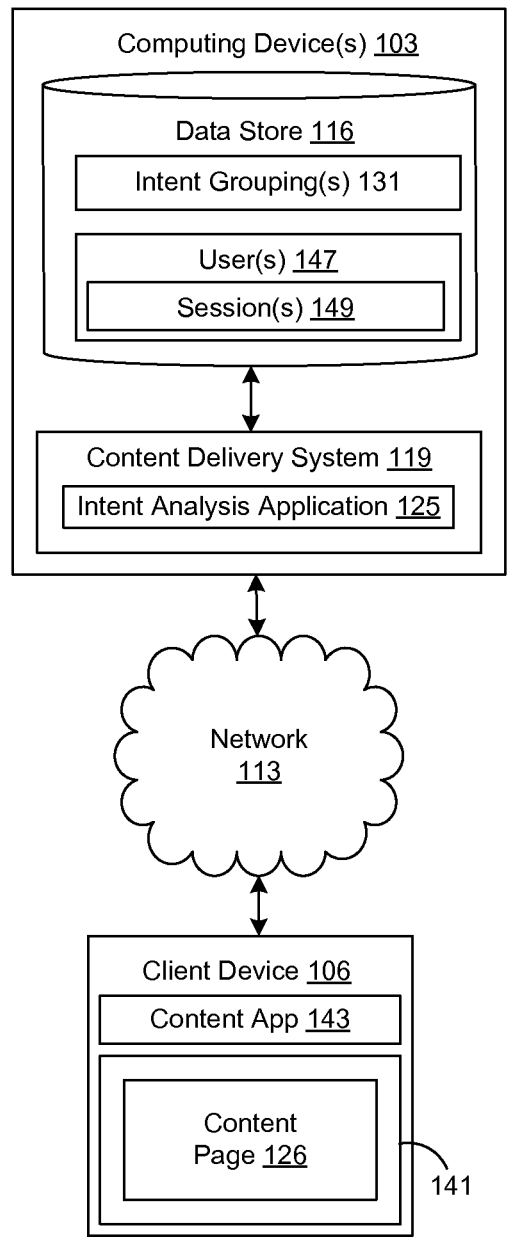
FIG. 1 is a drawing of a networked environment according to various embodiments of the present disclosure.

Comparison of a path followed by a current user to previous paths followed by previous users allows embodiments to facilitate the formation of inferences with respect to an intent of the current user. By inferring user intent, embodiments allow for the selection of content designed to facilitate the inferred intent or expected behaviors associated with the inferred intent and for the provision of that content to the user. In some embodiments, the path followed by a device associated with the current user and the paths followed by devices associated with previous users include network navigation information reflecting requests for content received from the device associated with the current user and the devices associated with the previous users, respectively. In some embodiments, the path followed by a device associated with the current user and the paths followed by devices associated with previous users include physical navigation information reflecting location data received with respect to the device associated with the current user and the devices associated with the previous users, respectively. In some embodiments, the path followed by a device associated with the current user and the paths followed by devices associated with previous users include both network navigation information and physical navigation information with respect to the device associated with the current user and the devices associated with the previous users, respectively.

In some embodiments, path information is coupled to contextual information, called contextual flags, to offer enhanced inferences with respect to user intent. Examples of context flags include information such as the regency or staleness of paths and behavior, which allow embodiments to give higher amounts of weight to recently followed paths. Other examples of contextual flags include enhanced weightings of paths or behaviors that are repeated by one or multiple users, or decreased weightings of paths that fail to reliably predict an expected behavior. As another example of contextual flags, if a group of paths include a particular location, a geographic information system (GIS) context data store is consulted to ascertain activities occurring at that location to enhance the quality of inferences with respect to user intent that are generated. As a further example, if a group of paths include a particular content source on a network, the content of the network data source is reviewed to identify activities associated with that content data source to enhance the quality of inferences with respect to user intent that are generated.

Therefore, because an expected user behavior can be identified, embodiments of the disclosure can also identify paths associated with users that deviate from an expected behavior, which can inform decisions regarding fraud, security risks, or other behavior that can be flagged for some type of threat investigation. In some embodiments, such a deviation from an expected behavior can inform a decision regarding whether the user might be lost or in need of some assistance rather than the user representing a threat of some kind.

Accordingly, with reference to FIG. 1, shown is a networked environment 100 according to various embodiments. The networked environment 100 includes one or more computing devices 103, and one or more client devices 106 coupled to a network 113. Some embodiments can include one or more third party sites 107 coupled to the network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above. A third party site 107 can comprise a Web site, content delivery network, or other system that can deliver content to a client device 106 that may be operated by another party.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The content delivery system 119 is one example of an application that is executed on a computing device 103 in order to provide access to content that is served over the network 113. To this end, the content delivery system 119 acts as a gateway through which requests are received and responses transmitted to the clients 106. It is understood that other applications and components, such as, an application implementing the hypertext transport protocol, may be executed on the computing device 103 beyond those described herein. The intent analysis application 125 is executed to analyze navigation paths associated with users, whether these paths are related to various requests for content from the content delivery system 119 and/or physical movements of a user that can be tracked via a mobile device. For example, the intent analysis application 125 can track movements of a user through an electronic commerce site facilitated by the content delivery system 119, which can include the visiting of various content pages, following of various hyperlinks, and other behavior. As one example, the intent analysis application 125 can identify a path of a user through an electronic commerce site that involves entry of a search term in a form, visiting of a product detail page, browsing of reviews, and completion of a purchasing workflow.

The computing device 103 may, in some embodiments, provide many different applications that are involved, for example, in providing services offered by an online merchant, a search engine, or other services that involve delivering content over a network 113. For example, the computing device 103 may execute applications that facilitate the ordering of goods online by customers by manipulating a user interface on a client 106. The computing device 103 may also execute a search engine, search indexer, etc., that facilitate the functionality of a search engine.

In one embodiment, the content delivery system 119 can facilitate the generating of dynamic content pages such as, for example, dynamic web pages that are provided to clients 106 in response to various requests. As contemplated herein, the data store 116 may be representative of many different data stores included in a given system. The data store 116 may comprise, for example, a cloud computing platform in which data is stored.

The data store 116 can also include data about users 147 of the content delivery system 119. In some embodiments, each user 147 can be associated with various identification data, profile data, or other data about the user. Additionally, session 149 data can be stored for each user 147 in a content delivery system 119, which can store data regarding navigation input data captured during one or more sessions associated with the user, purchase histories, search histories, and other session data. Additionally, profile data associated with each user 147 can be stored, which can contain information about the users' interests, social networks, location, and other profile data. For example, information about navigation paths of a user 147 can be stored in the session 149 data, which can allow movements of users within a site facilitated by the content delivery system 119 to be tracked. In some embodiments, location data provided by a mobile device can also be tracked in a user's session 149 data. Intent groupings, which group users according to the paths followed through a site as well as potentially geographic paths followed by a user in a given geographical area, can be tracked in the session 149 data.

The client device 106 is representative of a plurality of client devices 106 that may be coupled to the network 113. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), tablet computing system, set-top box, music players, or other devices with like capability. The client device 106 can also include a display device 141 upon which various content pages 126 and other user interfaces may be rendered. The client device 106 can also include one or more input devices with which a user can interact with a user interface rendered on the display device 141. For example, the client device 106 can include or be in communication with a mouse, touch input device (e.g., capacitive and/or resistive touchscreen), keyboard, or other input devices.

The client device 106 may be configured to execute various applications, such as a content application 143 and/or other applications. The content application 143 may be executed in a client device 106, for example, to access and render content pages 126, such as web pages, or other network content served up by the computing device 103 and/or other servers. The client device 106 may be configured to execute a special purpose application with which a user can interact with a user interface generated by the intent analysis application 125 and/or on the device itself. In some embodiments, certain functionality that is described in relation to the content delivery system 119 and/or intent analysis application 125 can be partially or wholly executed in the client device 106. In other words, a user interface can be generated and/or customized by the intent analysis application 125 without interactions over a network 113 with the computing device 103.

A content page 126 may be, for example, a dynamic network page such as a dynamic web page or other type of content. For example, while navigating through the various content pages 126 made available through the content delivery system, the content application 143 may send a request for a specific content page 126 to the content delivery system 119. The content delivery system 119 interfaces with the appropriate application(s) executed on the computing device 103 such as the intent analysis application 125, as well as any data stores 116 containing data necessary to encode a network page 126 to generate the desired content page that is then transmitted to the content application 143.

In some embodiments, the client 106 can include a mobile device that provides location data to the intent analysis application 125 for analysis of movements of the device to identify paths. Physical navigation path or traffic pattern information regarding mobile device user navigation between and among physical locations, such as among various stores in a shopping mall, may be analyzed to determine navigation paths between and among the locations. Such paths may be used to infer intent that is used as an aid in various types of advertising decisions, such as directing electronic advertising or coupons for a behavior associated with various paths that are statistically comparable to the path of the mobile device user, thus facilitating the expected behavior. Mobile device users' navigation paths such as the order in which users navigate among stores in a shopping mall, venders in flea market or rides in an amusement park, may be collected and may be aggregated over time to infer user intent and, from the inferred intent, recommend content appropriate to the inferred intent. Additionally, the intent analysis application 125 can identify outliers to attempt to identify certain behavior and/or predict behavior regarding their movements in a given area.

Positional information regarding the current location of such a mobile device user may be obtained in any of various manners, according to various embodiments. For example, location data derived from a Global Positioning System, wireless communication towers (e.g. triangulation), or other location finding services or methods can be provided to the intent analysis application 125. In some embodiments, a client can include a GPS navigation device (e.g., handheld and/or vehicle installed) or any device that can be tracked positionally and communicate with the intent analysis application 125 for the purposes of predicting intent of the user. Additional detail regarding the various ways in which expected user behavior with regard to navigation in a network site as well as with regard to a user's location is disclosed in U.S. application Ser. No. 13/076,237, filed Mar. 30, 2011 and entitled "Inferring User Intent Based on Network Navigation Paths," which is hereby incorporated herein in its entirety.

Next, a general description that provides one example of the operation of the various components of the networked environment 100 is provided. The content delivery system 119 can deliver a network page 126 over a network 113 for viewing by a user on a client 106 in a content application 143. As noted above, the content delivery system 119 can facilitate any type of content system, such as an electronic commerce system, a search engine, a blog network, and others as can be appreciated.

A client 106 can request content from the content delivery system 119 by submitting content requests for content served by the content delivery system 119. For example, a user can follow a hyperlink that causes a request for content to be submitted to the content delivery system 119. Accordingly, the intent analysis application 125 can track a user's requests for content from the content delivery system 119 and develop a path of hyperlinks followed and/or content requested during a user's session. In some embodiments, intent analysis application 125 may be configured to obtain (or receive) location data and/or requests for content from various clients 106 corresponding to various users among a user population. Intent analysis application 125 may be configured to store the location and content request information in the data store 116 so that intent groupings can be generated. For example, the intent analysis application 125 may be configured to continuously receive and analyze location data and content request information regarding many users over the course of days, weeks, months or even years to build path data structures comprising location and content request as well as related behavior, and to group the path data structures into intent groupings. These paths, once stored, may be compared to a current path associated with a user to determine whether the user's behavior is an outlier or deviates from an expected behavior.

In one embodiment, the intent analysis application 125 generates path groupings for inferring user intent by comparing paths and behavior of users and grouping paths according to path similarity or behavior similarity. Historical paths can be saved in a user's session 149 data or any other path data stores or data structure that records histories of content requests, location data associated with the physical locations of various devices and other behavior information.

The intent analysis application 125 is further configured to group the users into intent groupings based on comparison of the session 149 data associated with various users' interactions with the content delivery system 119. The intent analysis application 125 may create intent groupings based on common content requests or physical locations and store these groupings in intent groupings based on paths that are common to various users. These intent groupings 131 can be generated based at least upon similar content requests and/or physical location. In other words, intent groupings 131 are created by the intent analysis application 125 based at least upon a path similarity of historical paths that are tracked and associated with users. Determinations with respect to path similarity can be made by consulting analyzing geographical similarity of a location based path and/or similarity according to a site topology of a site facilitated by the content delivery system 119.

Embodiments vary with respect to the particular implementations used to determine intent groupings without departing from the scope and intent of the present disclosure. For example, some embodiments generate intent groupings by comparing statistical measures of path similarity. Examples of statistical measures of path similarity vary. In one embodiment, statistical measures of path similarity are determined by calculating a number or percentage of common content requests or common locations visited along a path. Alternatively, statistical measures of path similarity are determined by calculating a number or percentage of "similar" content requests or "similar" locations visited along a path. Additionally, in the case of an electronic commerce site, various paths may exhibit behavior of users that browse and/or purchase different products or items within the site, but may follow the same path in the context of the topology of the site, and can be grouped together in an intent grouping 131.

Various paths can also be grouped together according to temporal, or time based, factors as well. For example, the intent analysis application 125 can analyze the time a user spends on various pages of a particular site and/or in geographic locations in order to generate a path by timestamping the various entries in a session 149, and these timestamps can be a component of a similarity analysis between various paths that can be tracked.

Paths may be determined with respect to individual content requests pointed to individual content sources in a particular order or, it is contemplated that similar techniques may be applied to network navigation paths without regard to order among various content sources. For example, a first user may generate content requests directed to a set of content sources A, B and C in that order, while another user may generate content requests to these sources in the order B, A, C. Some embodiments will regard a BAC path as equivalent to an ABC path, while other embodiments will ascertain that these paths are distinct.

Therefore, having built a corpus of intent groupings 131 based upon paths that are tracked in user's sessions 149 according to content and/or geography, the intent analysis application 125 can identify paths or behaviors that are unexpected and potentially associated with behavior that should be closely monitored for various risks. Accordingly, the intent analysis application 125 can monitor the interactions of a user with the content delivery system 119 to determine whether a path followed by the user through a site does not correspond to a historical path that is associated with an intent grouping 131. In one embodiment, the intent analysis application 125 can identify a starting point associated with a path of a user and then identify whether a subsequent step on the path corresponds to a historical path that is associated with an intent grouping 131. If the subsequent step does not correspond to such a historical path, the intent analysis application 125 can identify the behavior as unexpected.

As one example, a user may be engaging in fraudulent activity, which can be detected if this behavior manifests itself in a path that is not followed by other users. In other words, potentially fraudulent activity can be identified if the path of a user deviates from what is considered normal behavior, or the behavior associated with other historical paths and/or intent groupings 131. For example, if a user enters an electronic commerce site facilitated by the content delivery system 119 and proceeds directly to a product detail page without visiting a gateway page, search page, product category page, etc., and proceeds to attempt to purchase the product with varying credit card numbers that fail, the intent analysis application 125 can identify this behavior as potentially fraudulent because it does not correspond to historical paths that are associated with other intent groupings 131.

In some embodiments, the intent analysis application 125 can identify a statistically unlikely percentage of users who are deviating from what is considered normal behavior (e.g., behavior that is associated with a historical path and/or intent grouping 131), and flag the user's session for additional scrutiny. In some embodiments, this additional scrutiny can include raising a fraud risk measure that is computed to assess the fraud risk level of any transactions attempted by the user. As another example, subsequent requests for content initiated by the user can be redirected to an alternative server, such as a sandbox server, that isolates the user's activity to other servers and limits the potential security threat posed by the user. The intent analysis application 125 can also consider temporal factors to determine whether the behavior observed and/or a path followed that corresponds to a user represents unexpected behavior. As one example, a user who proceeds very quickly to purchase a high value item from an electronic commerce site without researching the product's features, browsing competitor products, reading reviews, or the like, may be flagged as noteworthy.

In some embodiments, users who are deviating from what is considered normal behavior can be identified as lost or potentially in need of assistance. Accordingly, the intent analysis application 125 can also flag a user's session as one in which the user may require assistance or support. As one example, a user may initiate a session browsing for products in a first category but may deviate from an expected behavior. Accordingly, the intent analysis application 125 can flag the user's session and initiate the process of offering the user assistance to complete a purchase or locate the information the user was seeking. As another example, in the case of a location based path, a user may exhibit behavior that deviates from what is considered a normal behavior. In such a scenario, this raises the possibility that the user may be lost or in danger. Accordingly, the intent analysis application 125 can flag the user's session and initiate the process of offering the user assistance such as directions to an intended destination.

The intent analysis application 125 can also take into account emerging behaviors that may not be associated with fraudulent and/or risky activity. Accordingly, while initial unique behavior may be considered unexpected and cause additional scrutiny, as additional users exhibit the same or similar behavior and an intent grouping 131 is generated, the behavior will no longer be unexpected behavior.

In response to identifying unexpected behavior of a user that does not correspond to a historical path and/or an intent grouping 131, the intent analysis application 125 can generate an alert that is communicated to an administrative user or an automated process that causes additional monitoring of the user during a path that does not correspond to an intent grouping 131.

Figure 2:
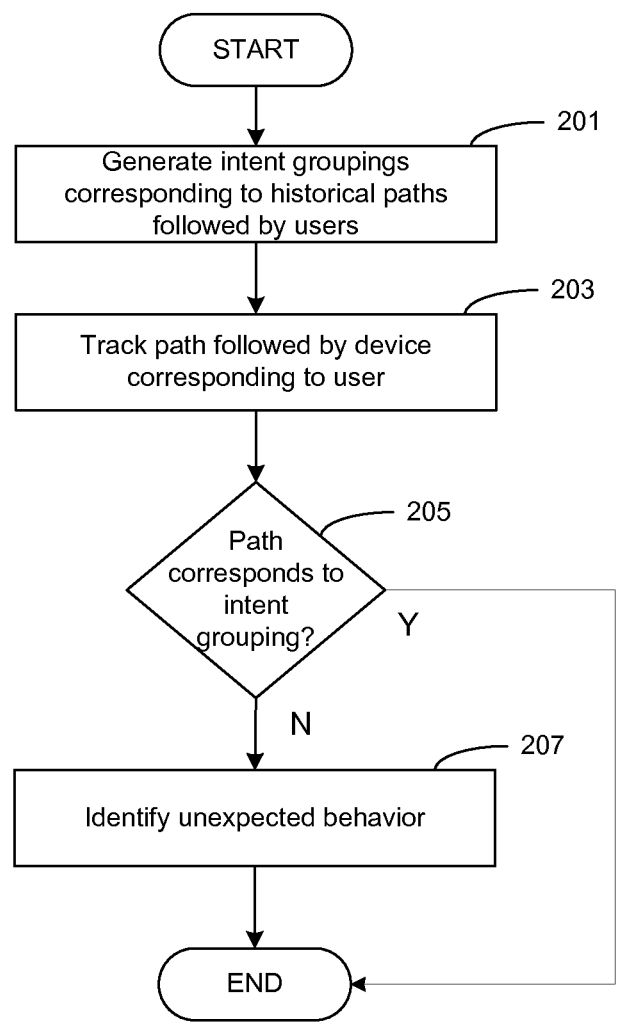
FIG. 2 is a flowchart illustrating one example of functionality implemented as portions of intent analysis application executed in a computing device in the networked environment of FIG. 1 according to various embodiments of the present disclosure.

Referring next to FIG. 2, shown is a flowchart that provides one example of the operation of a portion of the intent analysis application 125 according to various embodiments. It is understood that the flowchart of FIG. 2 provides merely an example of the many different types of functional arrangements that may be employed to implement the operation of the portion of the intent analysis application 125 as described herein. As an alternative, the flowchart of FIG. 2 may be viewed as depicting an example of steps of a method implemented in the computing device 103 (FIG. 1) according to one or more embodiments.

Beginning with box 201, the intent analysis application 125 can generate intent groupings 131 that are based on historical paths followed by users through a site facilitated by the content delivery system 119. As noted above, paths that correspond to intent groupings 131 can also correspond to physical locations associated with a mobile device. In box 203, the intent analysis application 125 can track behavior associated with other users and, in box 205, determine whether the path followed by the user corresponds to an intent grouping 131 associated with one or more historical paths tracked by the intent analysis application 125. If the path does not correspond to one or more intent groupings 131, the intent analysis application 125 can identify the behavior as expected and take various remedial or preventative measures. As described above, a fraud risk measure can be raised so that additional scrutiny is placed on a transaction related to the path, additional monitoring can be imposed, subsequent content requests can be diverted to a sandbox server, or other remedial or preventative measures can be imposed.

Figure 3:
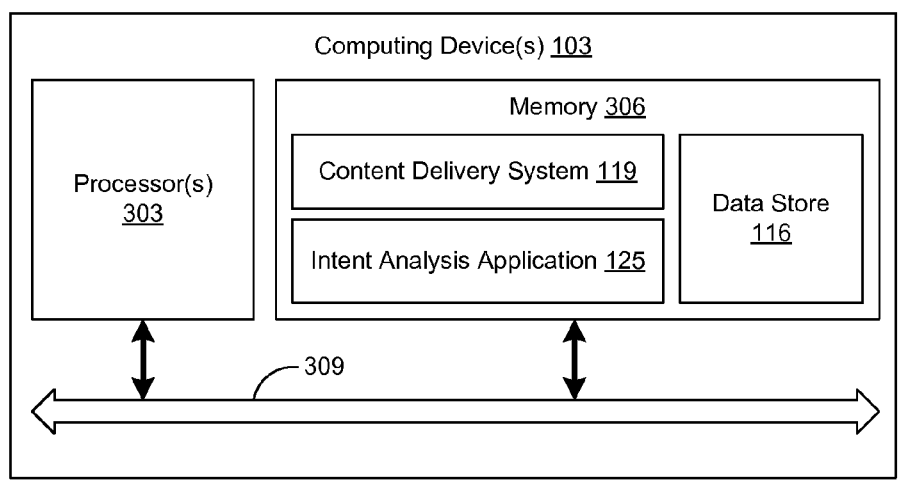
FIG. 3 is a schematic block diagram that provides one example illustration of a computing device employed in the networked environment of FIG. 1 according to various embodiments of the present disclosure.

With reference to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are content delivery system 119, the intent analysis application 125, and potentially other applications. Also stored in the memory 306 may be a data store 116 and other data. In addition, an operating system may be stored in the memory 306 and executable by the processor 303.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 113 that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the intent analysis application 125 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the intent analysis application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the intent analysis application 125, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

logic that generates at least one intent grouping associated with at least one historical path followed by a plurality of users by comparing statistical measures of the at least one historical path, the at least one historical path comprising content request information and information associated with a topology of a site;

logic that tracks a path followed by a user, the path corresponding to at least one of a collection of content requests and being associated with the topology of the site;

logic that identifies a starting point associated with the path;

logic that identifies at least one subsequent step associated with the at least one intent grouping;

logic that determines whether a subsequent step associated with the path deviates from the at least one subsequent step, the subsequent step being at least one of: following a hyperlink, visiting a product detail page, or completing a purchasing checkout workflow;

logic that, in response to determining that the subsequent step associated with the path deviates from the at least one subsequent step, identifies the path as associated with an unexpected behavior; and logic that generates at least one of a remedial measure and a preventative measure in response to the unexpected behavior wherein the at least one of the remedial measure and the preventative measure is at least one of raising a fraud risk measure associated with a user corresponding to the path, diverting subsequent content requests associated with the path to at least one alternative computing device, and initiating additional monitoring of the path.

2. The non-transitory computer-readable medium of claim 1, wherein the path corresponds to an attempt by the user corresponding to the path to defraud an electronic commerce site.

3. A system, comprising:

at least one computing device; and an intent analysis application executed in the at least one computing device, the intent analysis application further comprising:

logic that generates at least one intent grouping associated with at least one historical path followed by a plurality of users by comparing statistical measures of the at least one historical path, the at least one historical path comprising content request information and information associated with a topology of a site, the at least one intent grouping being based at least in part upon an amount of time that the plurality of users spend on various pages of a site or in a location;

logic that tracks a path followed by a user, the path corresponding to at least one of a collection of content requests and being associated with the topology of the site;

logic that identifies at least one subsequent step associated with the at least one intent grouping;

logic that determines whether a subsequent step associated with the path deviates from the at least one subsequent step associated with at least one intent grouping, the subsequent step being at least one of: following a hyperlink, visiting a product detail page, or completing a purchasing checkout workflow;

logic that, in response to determining that the subsequent step associated with the path deviates from the at least one subsequent step, identifies the path as associated with an unexpected behavior; and logic that generates at least one of a remedial measure and a preventative measure in response to the unexpected behavior.

4. The system of claim 3, wherein the intent analysis application further comprises:

logic that identifies a starting point associated with the path;

logic that timestamps the at least one subsequent step associated with the intent grouping; and wherein the logic that identifies the path as associated with an unexpected behavior further comprises logic that identifies the path as associated with the unexpected behavior based at least in part upon the timestamp.

5. The system of claim 3, wherein the intent analysis application further comprises:

logic that identifies a plurality of paths corresponding to the path; and logic that determines whether a statistically unlikely percentage of users corresponding to the paths deviate from the at least one intent grouping.

6. The system of claim 3, wherein the logic that imposes at least one of the remedial and preventative measure comprises logic that raises a fraud risk measure associated with a user corresponding to the path.

7. The system of claim 6, wherein the path corresponds to an attempt by a user corresponding to the path to defraud an electronic commerce site.

8. The system of claim 3, wherein the logic that imposes at least one of the remedial measure and the preventative measure further comprises logic that generates an alert corresponding to a user associated with the path, the alert causing activity of the user associated with the path to be monitored.

9. The system of claim 3, wherein the logic that imposes at least one of the remedial measure and the preventative measure further comprises logic that diverts subsequent content requests associated with the path to at least one alternative computing device.

10. The system of claim 3, wherein the logic that imposes at least one of the remedial measure and the preventative measure further comprises logic that flags a session associated with the user as in need of assistance.

11. The system of claim 3, wherein the at least one intent grouping further comprises at least one grouping of a plurality of historical paths corresponding to a plurality of other devices based at least upon a statistical measure of path similarity.

12. The system of claim 3, wherein the at least one intent grouping further comprises at least one grouping based at least upon an analysis of content similarity of sites in the paths.

13. The system of claim 3, wherein the at least one intent grouping further comprises at least one grouping based at least upon an analysis of common sites in a plurality of historical paths corresponding to a plurality of other devices.

14. A method, comprising:

tracking, in at least one computing device, a path followed by a device, the path comprising at least one content request generated by the device for content served by the at least one computing device and being associated with a topology of a site;

identifying, in the at least one computing device, at least one subsequent step associated with at least one intent grouping, the at least one intent grouping corresponding to an expected behavior and being associated with a plurality of historical paths corresponding to a plurality of other devices based at least upon a statistical measure of path similarity, the plurality of historical paths comprising content request information and information associated with the topology of the site;

determining, in the at least one computing device, whether a subsequent step associated with the path deviates from the at least one subsequent step, the subsequent step being at least one of: following a hyperlink, visiting a product detail page, or completing a purchasing checkout workflow; and identifying, in the at least one computing device, an unexpected behavior in response to determining that the subsequent step associated with the path deviates from the at least one subsequent step.

15. The method of claim 14, wherein the at least one intent grouping further comprises at least one grouping based at least upon an analysis of content similarity of sites in the paths.

16. The method of claim 14, wherein the at least one intent grouping further comprises at least one grouping based at least upon an analysis of common sites in a plurality of historical paths corresponding to a plurality of other devices.

17. The method of claim 14, wherein identifying an unexpected behavior when the subsequent step associated with the path deviates from the at least one subsequent step further comprises:
   identifying, in the at least one computing device, a starting point associated with the path; and
   timestamping, in the at least one computing device, the at least one subsequent step associated with the intent grouping.

18. The method of claim 14, wherein identifying an unexpected behavior when the subsequent step associated with the path deviates from the at least one subsequent step further comprises:
   identifying, in the at least one computing device, a plurality of paths corresponding to the path; and
   determining, in the at least one computing device, whether a statistically unlikely percentage of users corresponding to the paths deviate from the at least one intent grouping.

19. The method of claim 14, wherein the at least one intent grouping corresponds to an expected behavior in an electronic commerce site.

20. The method of claim 14, further comprising raising, in the at least one computing device, a fraud risk measure associated with a user corresponding to the path.

21. The method of claim 20, wherein the path corresponds to an attempt by a user corresponding to the path to defraud an electronic commerce site.

22. The method of claim 14, further comprising generating, in the at least one computing device, an alert corresponding to a user associated with the path, the alert causing activity of the user associated with the path to be monitored.

23. The method of claim 14, further comprising diverting, in the at least one computing device, subsequent content requests associated with the path to at least one alternative computing device.

* * * * *